(12) United States Patent
Nishimura

(10) Patent No.: US 7,810,620 B2
(45) Date of Patent: Oct. 12, 2010

(54) BRACKET MOUNTING STRUCTURE AND BRACKET MOUNTING METHOD

(75) Inventor: Makoto Nishimura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1071 days.

(21) Appl. No.: 11/384,484

(22) Filed: Mar. 21, 2006

(65) Prior Publication Data

US 2006/0214413 A1    Sep. 28, 2006

(30) Foreign Application Priority Data

Mar. 24, 2005    (JP) .............................. 2005-085874

(51) Int. Cl.
F16F 9/54    (2006.01)
(52) U.S. Cl. .................... 188/322.19; 29/505
(58) Field of Classification Search ............ 188/321.11, 188/322.11, 322.19; 29/469.5, 451, 505, 29/508, 510
See application file for complete search history.

(56) References Cited

U.S. PATENT DOCUMENTS

| 4,274,654 A | * | 6/1981 | Travaglio | ............ 280/124.154 |
| 4,392,294 A | * | 7/1983 | Campbell | ............ 29/451 |
| 4,484,670 A | * | 11/1984 | Axthammer et al. | ... 188/322.19 |
| 4,783,897 A | * | 11/1988 | Basnett | ............ 92/161 |
| 5,607,035 A | * | 3/1997 | Fulks et al. | ............ 188/322.19 |
| 2004/0168297 A1 | | 9/2004 | Nishimura et al. | |

FOREIGN PATENT DOCUMENTS

| CN | 2200745 | 6/1995 |
| JP | 2000-46090 | 2/2000 |
| JP | 2004-223612 | 8/2004 |

* cited by examiner

Primary Examiner—Christopher P Schwartz
(74) Attorney, Agent, or Firm—Wenderoth, Lind & Ponack, L.L.P.

(57) ABSTRACT

In a monotube type hydraulic shock absorber, a plurality of rectangular recesses that are elongate in a circumferential direction are formed in an outer circumferential surface of a cylinder at a position in the vicinity of an upper limit of a slidable range of a free piston. A support for supporting an external part such as a sensor or a hose is positioned so as to be fitted around a portion of the cylinder at which the recesses are formed. Thereafter, while supporting the rear sides of the recesses by a moving die of a receiving member, a plurality of pairs of punches are moved towards each other, to thereby press flat press portions of the punches against the support, thus drawing the support locally into the recesses of the cylinder without forming projections in an inner surface of the cylinder.

16 Claims, 5 Drawing Sheets

BRACKET MOUNTING STRUCTURE AND BRACKET MOUNTING METHOD

BACKGROUND OF THE INVENTION

The present invention relates to a bracket mounting structure and a bracket mounting method for securely joining a bracket to an outer circumferential surface of a tube. Specifically, the present invention relates to a bracket mounting structure and a bracket mounting method which can be advantageously used for mounting a bracket on a cylinder of a fluid machine such as a piston-cylinder assembly, a hydraulic shock absorber, a gas spring, etc.

For example, a monotube type hydraulic shock absorber used in a suspension of a vehicle is configured such that a free piston is slidably accommodated in a cylinder (a tube) so as to define a gas chamber and an oil chamber in the cylinder, and a piston which divides the oil chamber into an upper chamber and a lower chamber is slidably accommodated in the cylinder. In such a monotube type hydraulic shock absorber, a support (a bracket) for supporting an external part such as a sensor or a hose is adapted to be mounted on an outer circumferential surface of the cylinder. To mount this support, a means of welding is conventionally employed. In this case, however, due to the effect of heat generated during welding, the cylinder is likely to be subject to strain or deformation. Therefore, a position at which the support is mounted is limited to a lower end portion of the tube, which is outside a slidable range of the free piston (see, for example, Japanese Patent Public Disclosure No. 2000-46090).

Recently, an attempt has been made to mount a spring seat or a knuckle bracket on a cylinder of a hydraulic shock absorber, by utilizing a technique called mechanical clinch, for the purpose of omitting welding (see, for example, Japanese Patent Public Disclosure No. 2004-223612). The mechanical clinch disclosed in Japanese Patent Public Disclosure No. 2004-223612 is a technique of pressing an overlapping part of an outer spring seat or knuckle bracket and an inner cylinder by means of a punch, to thereby deform both the spring seat or knuckle bracket and the cylinder locally in a radially inward direction, and thus fastening (staking) the spring seat or knuckle bracket to the cylinder. In this technique, however, a projection is formed in an inner surface of the cylinder as a result of the staking. Therefore, this technique cannot be applied to a cylinder such as that of the above-mentioned monotube type hydraulic shock absorber, in which an inner surface of a cylinder is used as a slide surface for a sliding member such as a piston.

SUMMARY OF THE INVENTION

In view of the above, the present invention has been made. It is an object of the present invention to provide a bracket mounting structure and a bracket mounting method using an improved mechanical clinch joining technique, in which a bracket is mounted on a tube without forming a projection in an inner surface of the tube, thereby enabling a wide range of applications.

In order to achieve the above-mentioned object, the present invention provides a bracket mounting structure for mounting a bracket on a tube, the tube having a recess formed in an outer circumferential surface thereof, wherein the bracket is securely joined to the tube by fitting the bracket around the tube and deforming the bracket locally into the recess without causing any substantial deformation of an inner circumferential surface of the tube. In this bracket mounting structure, the bracket is deformed locally into the recess without causing any substantial deformation of the inner circumferential surface of the tube. Therefore, no projection is formed in the inner circumferential surface of the tube.

In the bracket mounting structure of the present invention, it is preferred that the recess have a rectangular configuration that is elongate in a circumferential direction of the tube. With this arrangement, a joint portion between the bracket and the tube has high shear strength, and has sufficient resistance to a load applied to the bracket when the bracket starts to move relative to the tube in an axial direction. In other words, the size of the recess formed in the tube can be made small, and therefore an effect of drawing relative to the inner circumferential surface of the tube can be suppressed.

In the bracket mounting structure of the present invention, the type of tube and the type of bracket are not particularly limited. However, it is preferred that the bracket form a support member for an external part such as a sensor, and that the tube form a cylinder of a monotube type hydraulic shock absorber, the cylinder having a piston member slidably accommodated therein. In the bracket mounting structure of the present invention, a bracket can be mounted even at a position a corresponding inner surface of which is within a slidable range of the piston (or a free piston). Therefore, the bracket mounting structure of the present invention is especially advantageous when it is applied to a cylinder of a monotube type hydraulic shock absorber. The monotube type hydraulic shock absorber may have a piston and a free piston slidably accommodated in the cylinder. In this monotube type hydraulic shock absorber, the bracket may be securely joined to the outer circumferential surface of the tube at a position in a slidable range of the piston member (the piston and the free piston).

In the bracket mounting structure of the present invention, the tube may have a smooth inner circumferential surface, and the joint portion may be formed in a state such that the bracket fills the inside of the recess formed in the outer circumferential surface of the tube and snugly fits against the recess. There may be a plurality of joint portions arranged in the circumferential direction.

Further, in order to achieve the above-mentioned object, the present invention also provides a bracket mounting method comprising the steps of:

providing a tube having a recess formed in an outer circumferential surface thereof;
fitting a bracket around the tube; and
deforming the bracket into the recess by means of a punch provided at an outer periphery of the bracket, with a die being provided in contact with the tube on a rear side of the recess, to thereby securely join the bracket to the tube.

The recess may have a rectangular configuration that is elongate in a circumferential direction of the tube, and the punch may include a press portion in a flat form conforming to the recess.

In the method of the present invention, when the bracket is drawn locally into the recess of the tube by means of the punch, a moving die provided in a mandrel inserted into the tube may be moved in a radially outward direction so as to support the rear side of the recess. With this arrangement, an effect of drawing relative to the inner circumferential surface of the tube can be reliably suppressed.

According to the bracket mounting structure and method of the present invention, a bracket can be mounted on a tube without forming a projection in an inner circumferential surface of the tube, which enables a wide range of applications. The present invention is especially advantageous when it is applied to a monotube type hydraulic shock absorber, because a support member can be mounted on a cylinder at a position even in a slidable range of the piston.

BRIEF DESCRIPTION OF THE DRAWINGS

FIG. 4(2) is a side view of the punch.

DETAILED DESCRIPTION OF THE INVENTION

Hereinbelow, an embodiment of the present invention is described in detail, with reference to the accompanying drawings.

Figure 1:
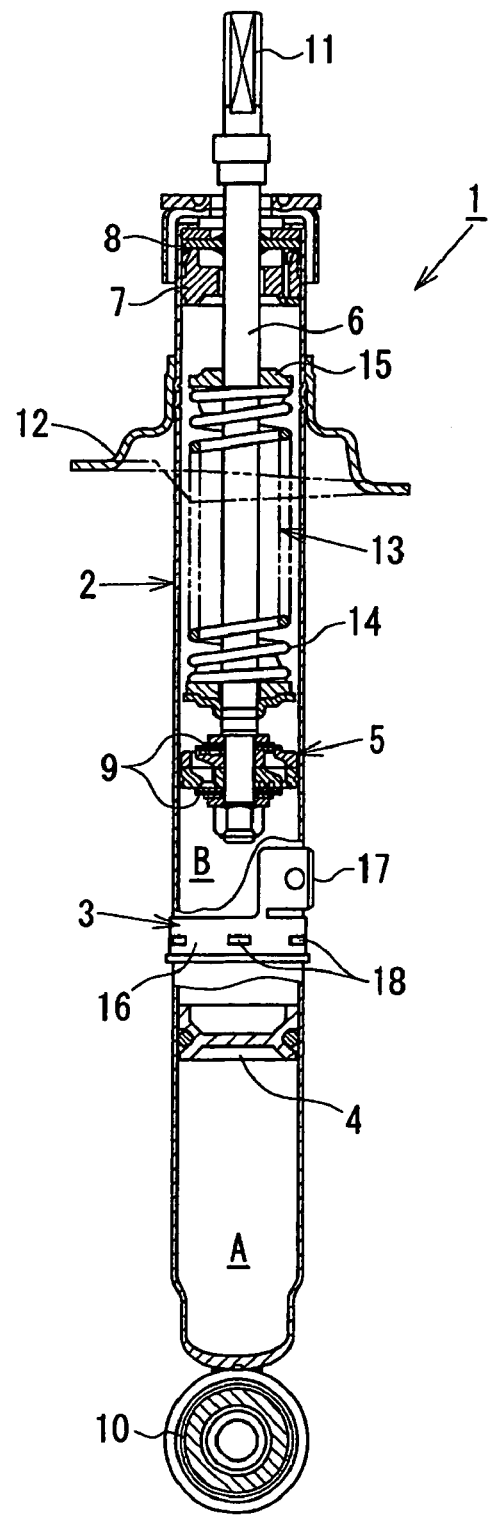
FIG. 1 is a cross-sectional view showing an entire structure of a monotube type hydraulic shock absorber, as one application of a bracket mounting structure of the present invention.

In this embodiment, the present invention is applied to a monotube type hydraulic shock absorber 1 for a suspension of a vehicle as shown in FIG. 1, so as to securely join a support (a bracket) 3 for supporting an external part such as a sensor, a hose, etc., to an outer circumferential surface of a cylinder (a tube) 2. The cylinder 2 has a cylindrical form having one end closed. A free piston 4 and a piston 5 are slidably accommodated in the cylinder 2. The free piston 4 divides the inside of the cylinder 2 into a gas chamber A and an oil chamber B, and the piston 5 divides the oil chamber B into an upper chamber and a lower chamber. One end of a piston rod 6 is connected to the piston 5, and the other end of the piston rod 6 slidably extends to the outside of the cylinder 2 through a rod guide 7 and an oil seal 8 mounted on an open end of the cylinder 2. In the hydraulic shock absorber 1, a gas, such as a nitrogen gas, and a hydraulic fluid are sealably contained in the gas chamber A and the oil chamber B, respectively. The piston 5 includes a damping force generating mechanism 9 for generating a damping force during an extension stroke and a compression stroke of the piston rod 6.

The hydraulic shock absorber 1 is attached to a suspension arm (not shown) through an attachment eye 10 fixed to the closed end of the cylinder 2, and also attached to a vehicle body through an attachment portion (a threaded portion) 11 formed at the other end of the piston rod 6. Further, a suspension spring (not shown) is supported by a spring seat 12 fixed to an upper end portion of the outer circumferential surface of the cylinder 2. In this state, according to an extension stroke and a compression stroke of the piston rod 6, the hydraulic fluid flows between the upper chamber and the lower chamber of the oil chamber B. During this time, a damping force is generated through the damping force generating mechanism 9 provided in the piston 5. The hydraulic fluid in an amount corresponding to the volume of a portion of the piston rod 6 which enters or exits the cylinder 2 is compensated for by a change in the volume of the gas chamber A. In FIG. 1, reference numeral 13 denotes a rod stopper device for moderating an impact generated during an extension stroke of the piston rod 6. The rod stopper device 13 comprises a rebound spring 14 having one end engaged with the piston rod 6 and a rebound cushion 15 disposed at the other end of the rebound spring 14. The rebound cushion 15 is adapted to collide against the rod guide 7.

Figure 2:
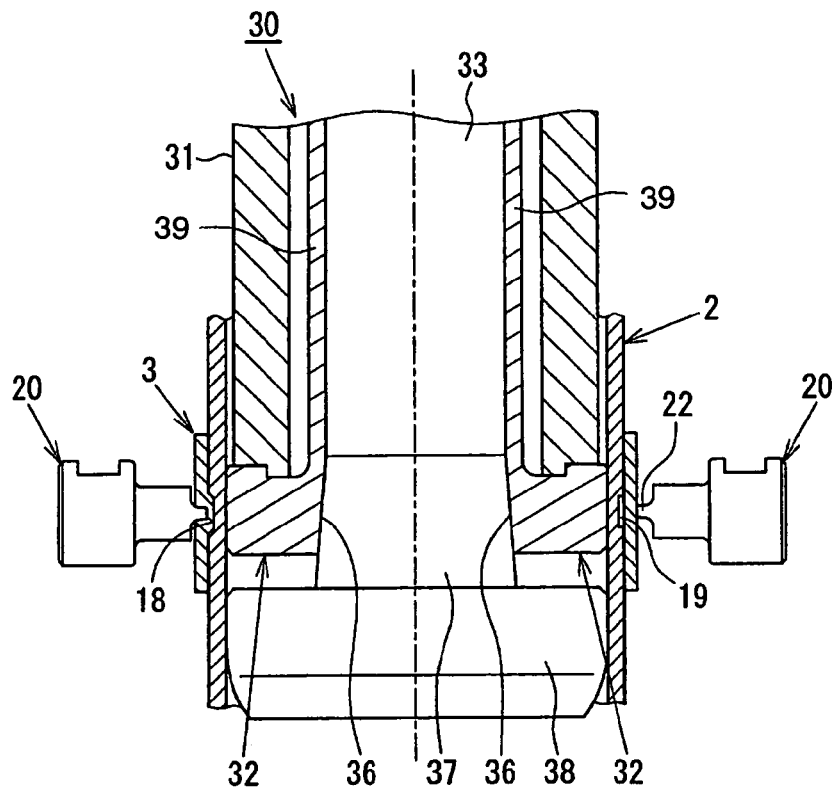
FIG. 2 is a cross-sectional view indicating a bracket (support) mounting structure for a cylinder of the monotube type hydraulic shock absorber, and how a method for mounting the bracket on the cylinder is carried out.
Figure 3:
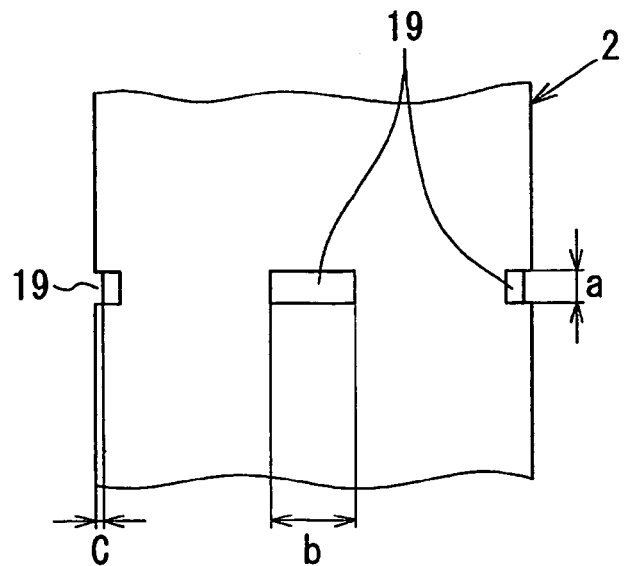
FIG. 3 is a front view showing a configuration of a recess formed in an outer circumferential surface of the cylinder.

In this embodiment, the support 3 is mounted on the cylinder 2 at a position in the vicinity of an upper limit of a slidable range of the free piston 4. The support 3 comprises a cylindrical portion 16 fitted around the cylinder 2 and a mount portion 17 for mounting an external part. The cylindrical portion 16 is fixed to the cylinder 2 at four joint portions 18, which are equally arranged in a circumferential direction of the cylindrical portion 16. As shown in FIG. 2, each joint portion 18 has a structure (a mounting structure) such that the support 3 is drawn locally into a recess 19 which is preliminarily formed in the outer circumferential surface of the cylinder 2. As shown in FIG. 3, the recess 19 formed in the outer circumferential surface of the cylinder 2 has a rectangular configuration that is elongate in the circumferential direction. Therefore, each joint portion 18 as a whole has a rectangular configuration that is elongate in the circumferential direction.

Figure 4:
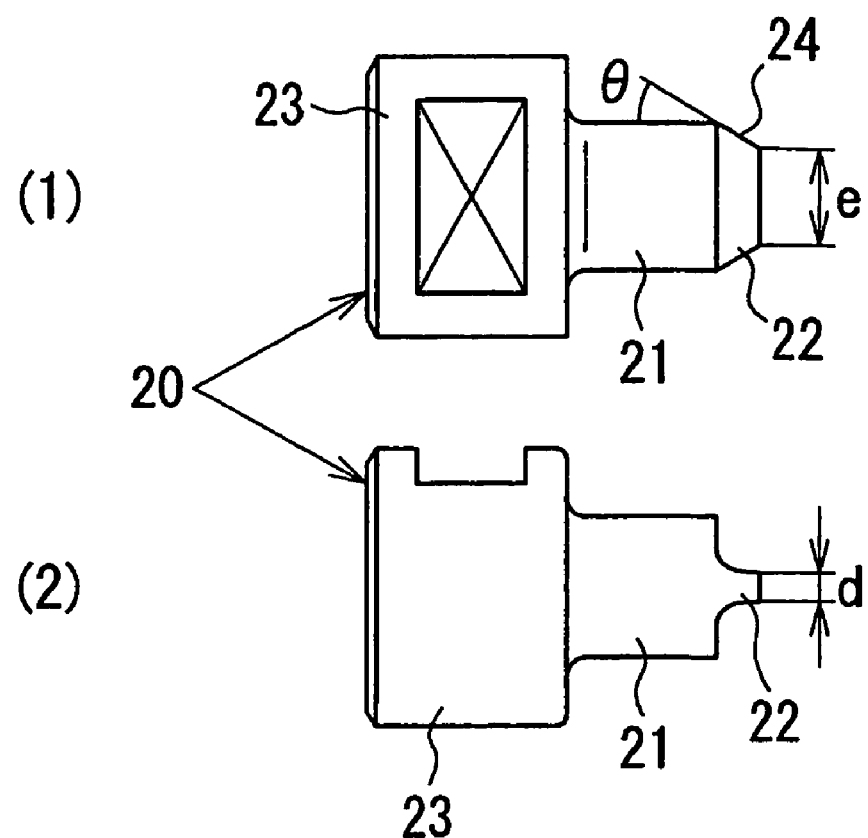
FIG. 4(1) is a plan view of a punch used in a bracket mounting method of the present invention.

As shown in FIG. 2, the support 3 is mounted on the cylinder 2, using a processing device which comprises two pairs of punches 20 (only one pair of punches 20 is shown in FIG. 2) disposed in diametrically opposite positions around the cylinder 2, and also comprises a receiving member 30 inserted into the cylinder 2. Each pair of punches 20 are supported by drive means (not shown) so as to be movable towards and away from each other. As shown in FIG. 4, each punch 20 comprises a shaft-like central body portion 21, a press portion 22 formed on one end of the body portion 21, which press portion has a flat form conforming to the rectangular recess 19 formed in the cylinder 2, and a holding portion 23 formed on the other end of the body portion 21 and adapted to be held by the drive means. Lateral side surfaces of the press portion 22 of each punch 20 are chamfered to thereby form taper surfaces 24 (which may be curved). Upper and lower surfaces of the press portion 22 are formed with draft angles.

As shown in FIG. 3, an axial width a of the recess 19 is set to be about 2.5 to 3.0 times the wall thickness of the cylindrical portion 16 of the support 3, and a circumferential length b of the recess 19 is set to be about 4 times the axial width a of the recess 19. A depth c of the recess 19 is about 10 to 20% of the wall thickness of the cylinder 2. By way of example, when the wall thickness of the support 3 is 1.6 mm and the wall thickness of the cylinder 2 is 2 mm, a=4 to 5 mm, b=16 to 20 mm, and c=0.2 to 0.4 mm.

The reason that the axial width a of the recess 19 is set to be about 2.5 to 3.0 times the wall thickness of the cylindrical portion 16 of the support 3 is as follows.

The cylindrical portion 16 is two-folded when it is drawn into the recess 19. Therefore, to enable the cylindrical portion 16 to be drawn into the recess 19 while suppressing deformation of the recess 19, the axial width a is required to be at least two times the wall thickness of the cylindrical portion 16, with the addition of a thickness d of a distal end of the press portion 22 of the punch 20. However, when the axial width a is too large, the cylindrical portion 16 in the recess 19 is likely to be deformed and separated from the recess 19. Therefore, the axial width a is preferably narrow, and most preferably about 2.5 to 3.0 times the wall thickness of the cylindrical portion 16.

With respect to each punch 20, as shown in FIG. 4, the thickness d of the distal end of the press portion 22 is set to be about 25% of the axial width a of the recess 19, a width e of the distal end of the press portion 22 is about 25% of the circumferential length b of the recess 19, an angle θ of the taper surface 24 is about 45 degrees, and the draft angle is about 20 degrees. By way of example, when the axial width a of the recess 19 is 4 mm and the length b is 16 mm, d=1 mm and e=4 mm.

Figure 5:
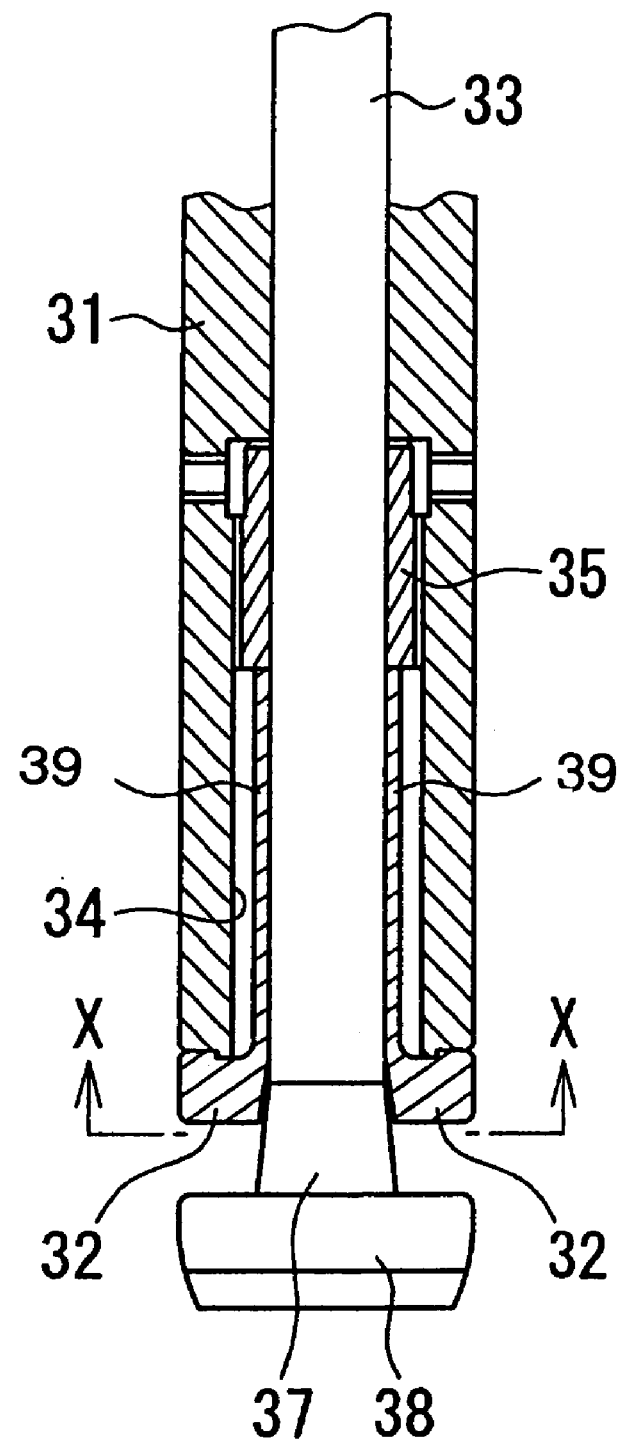
FIG. 5 is a cross-sectional view showing a structure of a receiving member used in the bracket mounting method of the present invention.
Figure 6:
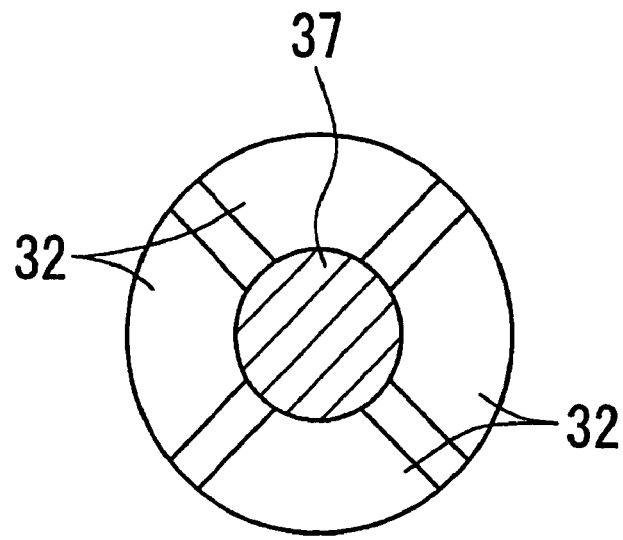
FIG. 6 is a cross-sectional view, taken along the line X-X in FIG. 5.

As shown in FIGS. 5 and 6, the receiving member 30 adapted to cooperate with the punches 20 comprises: a hollow mandrel 31 capable of being inserted into the cylinder 2; four sections of a moving die 32 provided in contact with an end face of the hollow mandrel 31; and a working rod 33 extending through the hollow mandrel 31 and adapted to enable the sections of the moving die 32 to advance or retract in a radial direction. The hollow mandrel 31 includes an opening 34 formed in a forward end portion thereof, and a cylindrical holder 35 is screwed into an inner bottom portion of the opening 34. The sections of the moving die 32 are formed as integral parts of lower ends of four support pieces 39 extending from the cylindrical holder 35. Rear surfaces of the moving die sections 32 form taper surfaces 36. On the other hand, a cone 37 having an outer circumferential surface in a conical form is formed as an integral part of a forward end of the working rod 33. The conical surface of the cone 37 is adapted to wedge between the taper surfaces 36 of the moving die sections 32. Normally, the working rod 33 is positioned in a state such that a major part of the cone 37 exists outside the moving die 32. In this state, the moving die sections 32 are positioned at a retracted end position at which respective end faces of the sections are flush with an outer circumferential surface of the mandrel 31. In this state, when the working rod 33 moves upward, the cone 37 slidably moves along the taper surfaces 36 as the rear surfaces of the moving die sections 32, to thereby move the moving die sections 32 in a radially outward direction. Consequently, as shown in FIG. 2, the end faces of the moving die sections 32 are brought into abutment against the inner surface of the cylinder 2.

In this embodiment, a guide portion 38 is provided at the forward end of the working rod 33. The guide portion 38 is capable of being inserted into the cylinder 2 with a slight clearance (for example, about 0.1 to 0.2 mm). When the receiving member 30 is inserted into the cylinder 2, the guide portion 38 prevents the mandrel 31 and the moving die 32 from making contact with and damaging the inner surface of the cylinder 2. An outer circumferential surface of the guide portion 38 is mirror-finished. In a case that a slight clearance is formed between the guide portion 38 and the cylinder 2, an air curtain is formed between the guide portion 38 and the cylinder 2 during insertion, and the guide portion 38 itself is also kept out of contact with the cylinder 2. Air may be radially ejected through the guide portion 38. In this case, the guide portion 38 can be reduced in diameter.

Next, a description is made below with regard to a bracket mounting method using the punches 20 and the receiving member 30.

To mount the support 3 onto the cylinder 2, first, while fitting the support 3 around the cylinder 2 at a predetermined position (a bracket mounting position), the support 3 and the cylinder 2 are set at a predetermined position in the processing device. Subsequently, the receiving member 30 is inserted into the cylinder 2 while being guided by the guide portion 38 at the forward end of the working rod 33, and the moving die 32 is positioned at the bracket mounting position. In this instance, the working rod 33 is moved downward relative to the hollow mandrel 31 so that a major part of the guide portion 38 at the forward end of the working rod 33 exits the moving die 32, to thereby position the sections of the moving die 32 at the retracted end position. Subsequently, the working rod 33 is moved upward relative to the hollow mandrel 31. Consequently, the moving die sections 32 are pressed radially outward by the cone 37, and abut against the inner surface of the cylinder 2 at positions corresponding to the recesses 19, as shown in the right half of FIG. 2.

Thereafter, by means of the drive means (not shown), the two pairs of punches 20 are moved towards each other in a radially inward direction. Consequently, as shown in the left half of FIG. 2, the support 3 is pressed (drawn) locally into the recesses 19 formed in the outer circumferential surface of the cylinder 2, by means of the flat press portions 22 of the punches 20. Thus, the support 3 is securely joined to the cylinder 2 at four positions (the joint portions 18) at the same time. As described above, a sufficiently large wall thickness of the cylinder 2 is secured on the bottom side of the recesses 19. Therefore, when the punch 20 is moved into the recess 19 for pressing, the inner surface of the cylinder 2 is not substantially subject to strain or deformation due to the drawing. Especially in this embodiment, the rear sides of the recesses 19 are supported by the moving die 32, so that an effect of drawing relative to the inner surface of the cylinder 2 becomes nil. Further, both lateral sides of the press portion 22 of the punch 20 are formed with the taper surfaces 24. Therefore, the support 3 is not subject to concentrated stress at a portion thereof deformed around the press portion 22, and there is no problem of shear fracture of the support 3. Further, in this embodiment, four diametrically opposite portions of the support 3 are drawn at the same time. Therefore, a forming pressure efficiently acts on the joint portions 18, to thereby reduce a forming load.

After completion of an operation for securely joining the support 3 to the cylinder 2, the working rod 33 is moved downward relative to the mandrel 31. Consequently, the cone 37 at the forward end of the working rod 33 moves in a direction such that it exits the moving die 32, and the moving die sections 32 are retracted under resilient force of the support pieces 39. The press portion 22 of the punch 20 is smoothly separated from the joint portion 18 due to the draft angles, including the lateral taper surfaces 24, of the press portion 22.

Figure 7:
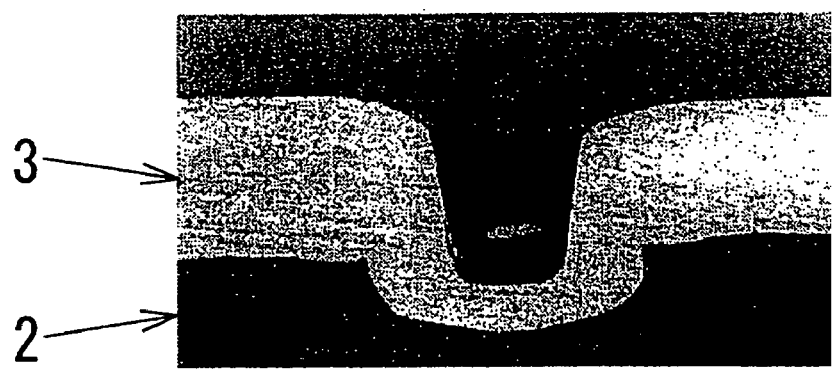
FIG. 7 is a macrophotograph indicating a joint portion which has been actually formed by the bracket mounting method of the present invention.

FIG. 7 indicates the joint portion 18 which has been actually formed in the above-mentioned manner. The support 3 sufficiently fills the inside of the recess 19 formed therebelow in the cylinder 2 and snugly fits against the recess 19. The thus formed joint portion 18 has a form that is elongate in a circumferential direction (see FIG. 1), due to cooperation between the recess 19 that is elongate in a circumferential direction and the flat punch 20 (the press portion 22). Shear strength of the joint portion 18 mainly depends on the circumferential length of the joint portion 18. Therefore, the joint portion 18 has sufficient resistance to a load applied to the bracket 3 when the bracket 3 starts to move relative to the tube 2 in an axial direction. Further, since the support 3 fills the inside of the recess 19 as described above, the joint portion 18 has sufficient resistance to a torque. In the monotube type hydraulic shock absorber 1, the support (bracket) 3 is required to resist a load of about 5 kN, and a torque of about 20 Nm. In this case, the length b (FIG. 3) of the recess 19 can be set to about 16 to 20 mm, and the depth c (FIG. 3) can be set to be about 0.2 to 0.4 mm.

Thus, in the cylinder 2 to which the support 3 has been securely joined, the inner surface of the cylinder 2 is not formed with a projection as a matter of course. Rather, the inner surface of the cylinder 2 is not subject to any strain or deformation due to the drawing. Therefore, the free piston 4 smoothly slides in the cylinder 2, thus enabling a function of the hydraulic shock absorber 1 to be sufficiently exerted. Recently, in many cases, in assembling the hydraulic shock absorber 1 of this type, supplying a gas and supplying a hydraulic fluid are conducted successively through an open end of the cylinder 2 in a single process. In the bracket mounting structure of the present invention, it is possible to avoid the inner surface of the cylinder 2 being formed with a projection which otherwise impedes movement of the free piston 4. Therefore, the supply of a gas and the supply of a hydraulic fluid can be conducted in a successive manner, to thereby enhance ease of assembly.

In the above-mentioned embodiment, the support 3 is securely joined to the cylinder 2 at four positions at the same time, by means of the two pairs of punches 20 disposed in diametrically opposite positions. However, the method of the present invention may be conducted in a manner such that the support 3 is first securely joined to the cylinder 2 at two positions at the same time by means of one pair of punches 20, and then relative rotation between the cylinder 2 and the pair of punches 20 at 90 degrees is effected, followed by securely joining the support 3 to the cylinder 2 at the other two positions. The number of positions at which the support 3 is joined, that is, the number of joint portions 18, is not limited. The support 3 may be secured at one, three, or five or more positions. The recess 19 in the cylinder 2 may extend along the entire periphery of the cylinder 2.

In the above-mentioned embodiment, the inner surface of the cylinder 2 is supported by the moving die 32 of the receiving member 30 when the punches 20 are pressed into the recesses 19. Such support can be omitted, however, if use is made of a cylinder having a larger wall thickness.

The entire disclosure of Japanese Patent Application No. 2005-085874 filed on Mar. 24, 2005 including specification, claims, drawings and summary is incorporated herein by reference in its entirety.

What is claimed is:

1. A bracket mounting structure including a tube having a recess formed in an outer circumferential surface thereof, wherein the tube does not have any substantial deformation on an inner circumferential surface thereof due to formation of the recess, and
a bracket securely joined to the tube by fitting the bracket around the tube and drawing the bracket fitted around the tube locally into the recess without causing any substantial deformation of the inner circumferential surface of the tube.

2. A bracket mounting structure according to claim 1, wherein the tube has a plurality of the recesses formed in the outer circumferential surface thereof so as to be arranged in a circumferential direction, each of the recesses having a rectangular configuration that is elongate in the circumferential direction.

3. A bracket mounting structure according to claim 2, wherein the bracket forms a support member for supporting an external part, and the tube forms a cylinder of a monotube type hydraulic shock absorber, the cylinder having a piston member slidably accommodated therein.

4. A bracket mounting structure according to claim 3, wherein the bracket is securely joined to a portion of the outer circumferential surface of the tube, the portion corresponding to a range in which the piston member is configured to slide.

5. A bracket mounting structure according to claim 4, wherein an axial width of each of the recesses is in a range of from 2.5 to 3.0 times a wall thickness of the bracket.

6. A bracket mounting structure according to claim 3, wherein an axial width of each of the recesses is in a range of from 2.5 to 3.0 times a wall thickness of the bracket.

7. A bracket mounting structure according to claim 2, wherein an axial width of each of the recesses is in a range of from 2.5 to 3.0 times a wall thickness of the bracket.

8. A bracket mounting structure according to claim 1, wherein the bracket forms a support member for supporting an external part, and the tube forms a cylinder of a monotube type hydraulic shock absorber, the cylinder having a piston member slidably accommodated therein.

9. A bracket mounting structure according to claim 8, wherein the bracket is securely joined to a portion of the outer circumferential surface of the tube, the portion corresponding to a range in which the piston member is configured to slide.

10. A bracket mounting structure according to claim 9, wherein an axial width of the recess is in a range of from 2.5 to 3.0 times a wall thickness of the bracket.

11. A bracket mounting structure according to claim 8, wherein an axial width of the recess is in a range of from 2.5 to 3.0 times a wall thickness of the bracket.

12. A bracket mounting structure according to claim 1, wherein an axial width of the recess is in a range of from 2.5 to 3.0 times a wall thickness of the bracket.

13. A bracket mounting method comprising:
providing a tube;
forming a recess in an outer circumferential surface of the tube without causing any substantial deformation of an inner circumferential surface of the tube;
fitting a bracket around the tube; and
drawing the bracket fitted around the tube locally into the recess without causing any substantial deformation of the inner circumferential surface of the tube, wherein the bracket is drawn into the recess by means of a punch provided at an outer periphery of the bracket, and with a die provided in contact with the tube on a rear side of the recess, to thereby securely join the bracket to the tube.

14. A bracket mounting method according to claim 13, wherein the recess has a rectangular configuration that is elongate in a circumferential direction of the tube, and the punch includes a press portion having a flat form that conforms to the recess.

15. A bracket mounting method comprising:
forming a plurality of recesses in an outer circumferential surface of a tube without causing any substantial deformation of an inner circumferential surface of the tube;
fitting a bracket around the tube;
inserting a die into the tube; and
drawing the bracket fitted around the tube locally into the recesses without causing any substantial deformation of the inner circumferential surface of the tube to thereby securely join the bracket to the tube, wherein the bracket is drawn into the recesses by means of a plurality of punches provided at an outer periphery of the bracket, and the die is in contact with an inner circumferential surface of the tube at a location corresponding to the positions of the recesses.

16. A bracket mounting method according to claim 15, wherein each of the recesses has a rectangular configuration that is elongate in a circumferential direction of the tube, and each of the punches includes a press portion having a flat form that conforms to the corresponding recess.

* * * * *